United States Patent [19]

Bates

[11] Patent Number: 5,624,350
[45] Date of Patent: Apr. 29, 1997

[54] AUTOMATED CLUTCH CONTROL AND CALIBRATION

[75] Inventor: Ian R. J. Bates, W. Yorkshire, England

[73] Assignee: Eaton Corporation, Cleveland, Ohio

[21] Appl. No.: 520,360

[22] Filed: Aug. 28, 1995

[30] Foreign Application Priority Data

Oct. 24, 1994 [GB] United Kingdom ............ 9421350

[51] Int. Cl.$^6$ .................................................. B60K 41/02
[52] U.S. Cl. ................... 477/78; 477/176; 477/180; 192/3.63; 192/52.4; 192/106 R
[58] Field of Search ..................... 477/78, 166, 176, 477/180; 192/3.63, 52.1, 52.4, 103 R, 109 F

[56] References Cited

U.S. PATENT DOCUMENTS

| | | | |
|---|---|---|---|
| 3,089,572 | 5/1963 | Herfurth | 192/109 F X |
| 4,081,065 | 3/1978 | Smyth et al. | 192/0.076 |
| 4,361,060 | 11/1982 | Smyth | 74/866 |
| 4,638,898 | 1/1987 | Braun | 192/0.052 |
| 4,646,891 | 3/1987 | Braun | 192/0.032 |
| 4,874,070 | 10/1989 | Nellums et al. | 477/78 X |
| 4,899,858 | 2/1990 | Cote et al. | 477/78 X |
| 5,065,891 | 11/1991 | Otsuka et al. | 192/103 R X |
| 5,275,267 | 1/1994 | Slicker | 192/0.033 |
| 5,314,050 | 5/1994 | Slicker et al. | 477/177 |
| 5,316,116 | 5/1994 | Slicker et al. | 477/181 |
| 5,337,874 | 8/1994 | Oltean | 192/111 |
| 5,393,274 | 2/1995 | Smedley | 477/74 |

FOREIGN PATENT DOCUMENTS

4306987-A1 9/1993 Germany ............ 192/109 F

*Primary Examiner*—Charles A. Marmor
*Assistant Examiner*—Nathan O. Jensen
*Attorney, Agent, or Firm*—Howard D. Gordon

[57] ABSTRACT

An automated clutch (16) control and calibration method. Clutch control parameter values (TP and AP) corresponding to the clutch touch point condition and the approach point condition, respectively, are determined and are utilized to control reengagement of the automated clutch. While awaiting reengagement, the clutch is caused to assume and dwell in the approach point condition.

13 Claims, 5 Drawing Sheets

AUTOMATED CLUTCH CONTROL AND CALIBRATION

BACKGROUND OF THE INVENTION

1. Field of the Invention

The present invention relates to the control and calibration of an automated master friction clutch as utilized in an at least partially automated mechanical transmission system.

2. Description of the Related Art

Vehicular automated mechanical transmission systems comprising a multiple-speed mechanical transmission drivingly connected to a fuel-controlled engine by means of an automatically actuated vehicle master friction clutch are well known in the prior art, as may be seen by reference to U.S. Pat. Nos. 4,081,065; 4,361,060; 4,527,447; 4,638,898; 4,648,290; 4,714,144; 4,873,637; 5,275,267; 5,293,316; 5,314,050 and 5,316,116, the disclosures of which are incorporated herein by reference.

To improve the controllability and responsiveness of the prior art master clutch control systems, it was known to determine a clutch control parameter value, such as a clutch actuator position, which corresponded to the "touch point" or "point of incipient engagement" of the clutch, i.e., that point or position during engagement of the master clutch at which the master clutch just began to transmit torque. The clutch touch point was determined or calibrated during a system startup routine and was thereafter subject to updating during ongoing vehicle operations.

During a controlled master clutch engagement, the master clutch was moved rapidly from its disengaged position to the touch point/point of incipient engagement, and then was further engaged in a controlled, modulated manner according to the applicable clutch control logic. Examples of such clutch control logic may be seen by reference to U.S. Pat. Nos. 4,646,891; 4,899,858 and 5,337,874, the disclosures of which are incorporated herein by reference.

SUMMARY OF THE INVENTION

According to the present invention, the responsiveness of vehicular automated master clutch control is improved, as compared to the prior art, by defining, during calibration operations, a control parameter value corresponding to an "approach point" as well as to the touch point, wherein the approach point is a point intermediate full disengagement and the touch point, preferably almost to the touch point. After full disengagement of the master clutch, when a required clutch engagement is expected, the clutch is moved to and dwells at the approach point, awaiting initiation of clutch engagement. The clutch may then be moved even more quickly and with less risk of overshoot to the touch point for commencement of controlled, modulated further engagement.

By way of example, to illustrate both a calibration technique and the relative values of control parameters corresponding to master clutch touch point and master clutch approach point, assuming some type of input shaft brake/ upshift brake, with the vehicle at rest, the control parameter value corresponding to approach point is determined by slowly moving from full disengagement toward engagement, with the input shaft brake off, and sensing for initial rotation of the input shaft, while the control parameter value corresponding to touch point is determined in the same manner, except that the input shah brake is active so that input shaft initial increased rotational speed is indicative of at least minimal clutch torque transfer.

Accordingly, it is an object of the present invention to provide a new and improved control and calibration method and system to improve responsiveness of automated vehicular master clutches. This and other objects and advantages of the present invention will become apparent from a reading of the detailed description of the preferred embodiment taken in connection with the drawings.

DESCRIPTION OF THE PREFERRED EMBODIMENT

Figure 1:
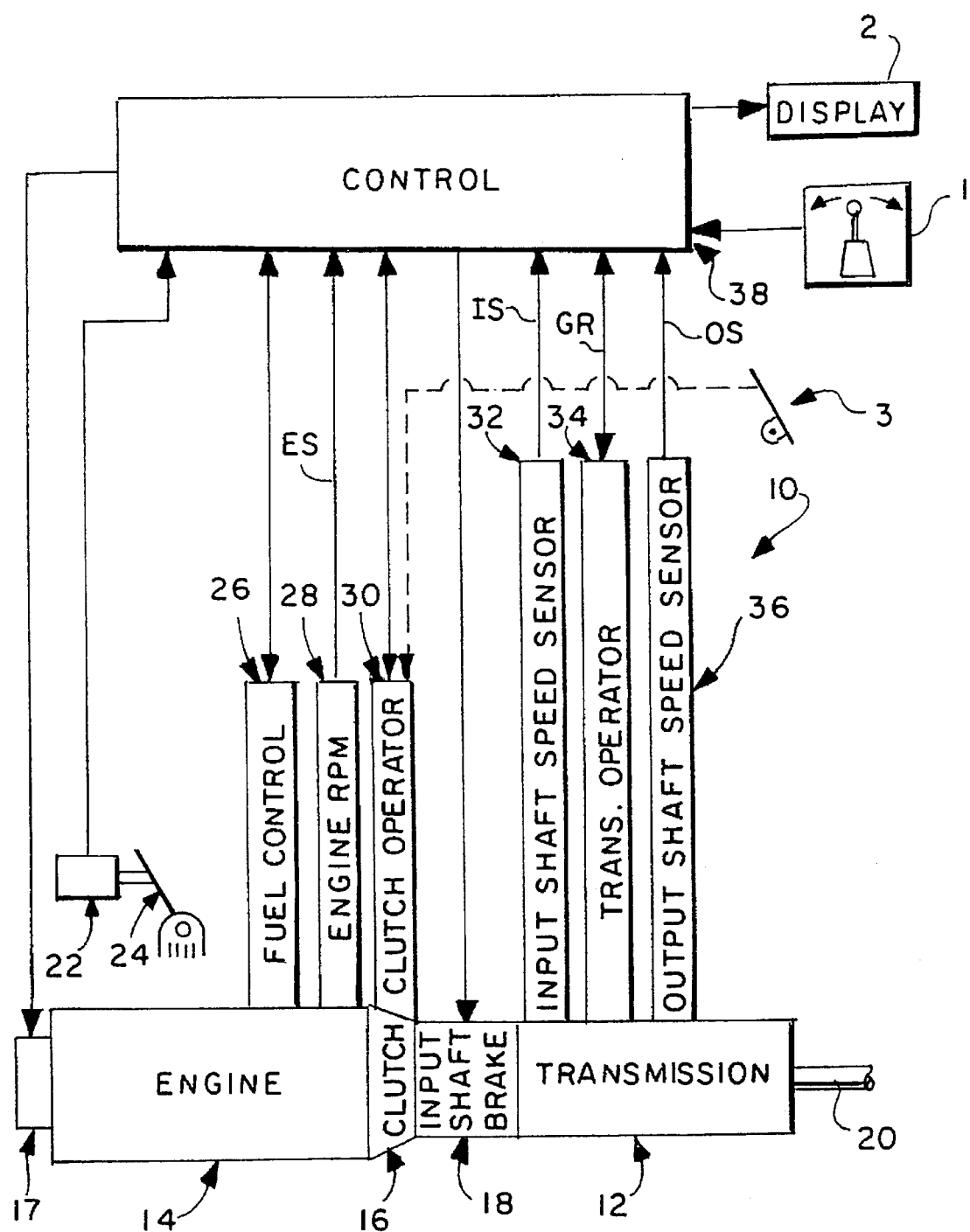
FIG. 1 is a schematic illustration of a vehicular automated mechanical transmission system having an automated master friction clutch.

FIG. 1 illustrates a semi-automatic mechanical transmission system, 10, of the type particularly advantageously utilizing the automated master clutch control and calibration method and system of the present invention. Semi-automated mechanical transmission system 10 comprises a multiplespeed, change-gear mechanical tranmission 12 driven by a throttle-controlled heat engine 14, such as a well-known diesel engine, through an automatically controlled master friction clutch 16. Semi-automated transmission systems of this general type may be seen by reference to U.S. Pat. Nos. 4,648,290; 4,930,081 and 5,157,607, the disclosures of which are incorporated herein by reference. It is understood, however, that the automated clutch control and calibration method and system of the present invention is also applicable to other types of fully or partially automated mechanical transmission systems, such as, for example, those illustrated in U.S. Pat. Nos. 4,361,060; 4,860,861; 5,261,288 and 5,305,213, the disclosures of which are incorporated herein by reference.

Semi-automatic mechanical transmission system 10 is typically intended for heavy-duty vehicle use and the output of transmission 12 is output shaft 20, which is adapted for driving connection to an appropriate vehicle component, such as the differential of a drive axle, a transfer case or the like, as well known in the prior art. Preferably, the automated system will include at least one of an engine brake 17 and/or an input shaft brake 18.

The aforementioned drivetrain components are acted upon and/or monitored by several devices, examples of each of which are known in the prior art. These devices include a throttle pedal position monitor assembly 22, which senses the position or setting of the operator-controlled vehicle throttle pedal 24, a throttle control device 26, which controls the supply of fuel to the engine, an engine speed sensor 28, which senses the rotational speed of the engine, a clutch operator 30 operable to selectively engage and disengage master friction clutch 16, an input shaft speed sensor 32 for providing a signal indicative of the rotational speed of the transmission input shaft, a transmission operator 34, which is effective to shift transmission 12 and/or to provide input signals indicative of the transmission engaged ratio, and an output shaft speed sensor 36 for providing a signal indicative of the rotational speed of transmission output shaft 20. Semi-automated mechanical transmission system 10 may also include a selector device 1 by which the vehicle operator selects engagement of a particular gear ratio and/or a mode of transmission operation and a display 2 for providing transmission system information to the operator. Additionally, the vehicle may be provided with a manually operated clutch pedal 3 by which the vehicle operator may override the system and disengage the master clutch.

The aforementioned devices supply information to and/or accept command output signals from a central processing unit or control 38. The central processing unit may include analog and/or digital or electronic calculation and logic circuitry, which is preferably microprocessor-based. An electrical power source (not shown) and/or a source of pressurized fluid (not shown) provides electrical and/or pneumatic and/or hydraulic power to the various sensing, operating and/or processing units. Drivetrain components and controls therefor of the type described above are known in the prior art and may be appreciated in greater detail by reference to U.S. Pat. Nos. 4,478,851; 4,019,614; 4,038,889 and 4,401,200.

Sensors 22, 28, 32, 34, 36 and 1 and the sensors associated with operators 26, 30, 18 and 34, may be of any known type or construction for generating analog or digital signals proportional to or indicative of the parameter monitored thereby. Similarly, operators 26, 30 and 34 may be of any known electrical, mechanical, pneumatic, hydraulic and/or electropneumatic type for executing operations in response to command signals from the central processing unit 38. The engine 14 may be electronically controlled over a data bus conforming to one of the SAE J1922, SAE J1939, ISO 11898 or similar protocols.

Figure 2:
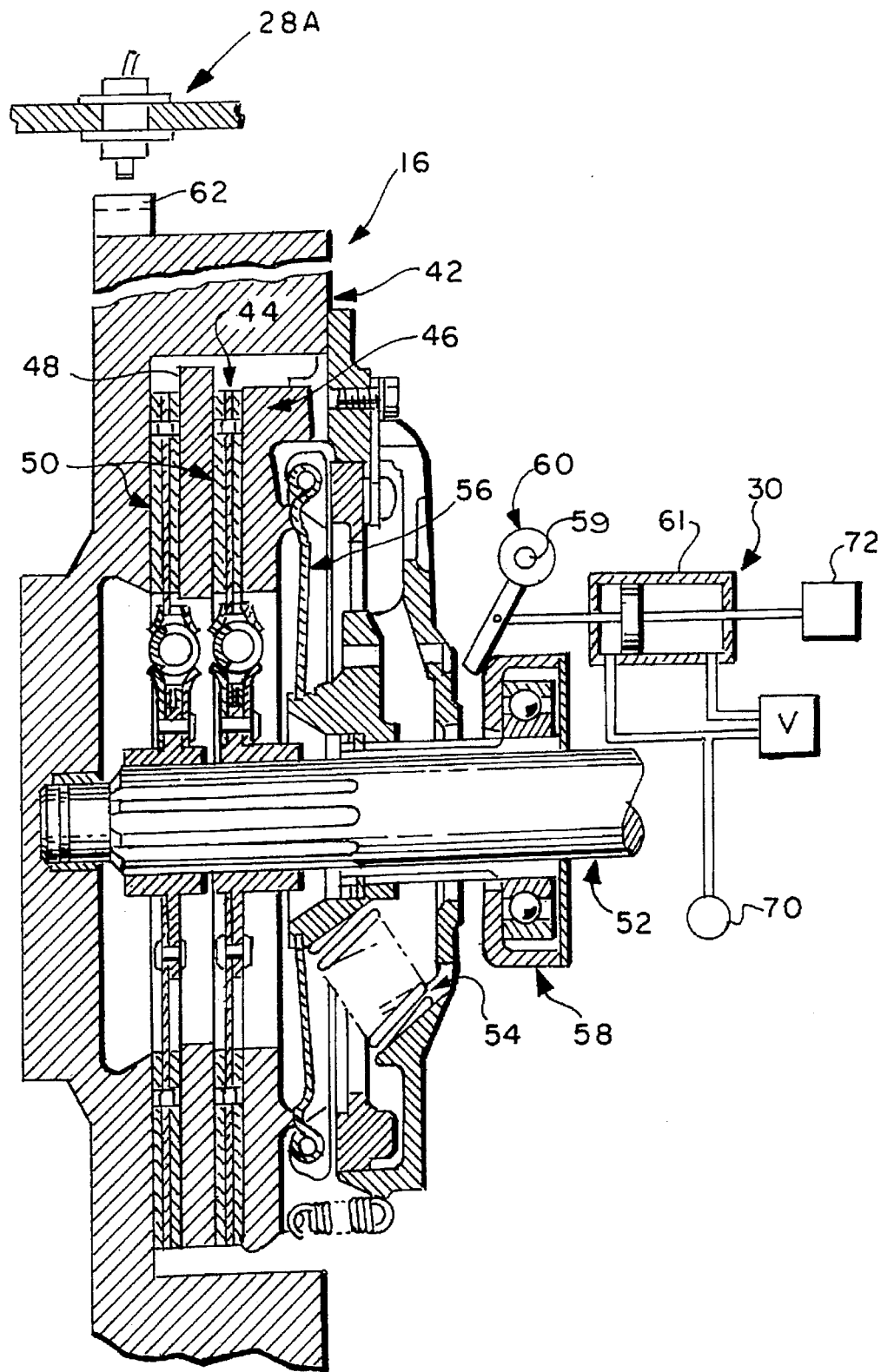
FIG. 2 is a cross-sectional view of a typical master friction clutch of the type controlled by the clutch control and calibration of the present invention.

A typical master friction clutch 16 of the type to be automatically controlled and calibrated by the control and calibration system of the present invention may be seen by reference to FIG. 2. It is understood, of course, that the specific construction of the clutch and actuator therefor are shown for illustrative purposes only and that the control and calibration system of the present invention is suitable for use in connection with clutches and/or operators therefor of differing structures. Further, in theory, the automated clutch and calibration method and system of the present invention is also suitable for use with so-called freestanding autoclutches associated with manually operated transmissions.

Clutch 16, illustrated, is a typical two-plate mechanical spring-applied clutch which is mounted to an engine flywheel 42. Internal lugs 44 on the inner radius of the flywheel 42 correspond to slots in the clutch pressure plate 46 and intermediate plate 48, causing these elements to rotate at engine speed. They are, however, free to move in an axial direction. Clutch-driven disks 50 are splined to the transmission input shaft 52 for rotation therewith. Clutch torque is provided by engaging springs 54 acting through levers 56 to apply pressure to pressure plate 46. This pressure squeezes the driven disks 50 and intermediate plate 48 between the pressure plate 46 and the engine flywheel 42. The magnitude of the clutch torque is proportional to this pressure.

The force provided by the spring 54 on the pressure plate 46 may be controlled by the axial position of the throw-out bearing assembly 58. Throw-out bearing assembly 58 may be moved in the axial direction by a control lever 60 mounted on a shaft 59. The shaft 59 is mounted in a clutch housing such that pivotal movement of the clutch control lever 60 will cause an axial movement of the throw-out bearing assembly 58. In this manner, movement of the control lever 60 can vary the force on pressure plate 46 and, therefore, the available clutch torque. A magnetic pick-up 28A is mounted in the clutch housing and detects tooth passage of the toothed rotor 62 located on the outer radius of the engine flywheel 42 to provide a signal proportional to engine speed.

Pivotal movement of the control lever 60 is controlled by a piston cylinder and control valve assembly 61. Lever 60 and assembly 61 comprise the clutch actuator 30. Control valve V may be as disclosed in aforementioned U.S. Pat. Nos. 4,081,065 and 4,361,060, comprising fine and coarse ports for both pressurizing and venting the chambers of the cylinder for modulated and rapid movement of lever 60. A sensor 70 for sensing clutch actuator pressure and/or a sensor 72 for sensing lever/piston position may be provided for providing input signals to controller 38.

The automated clutch control and calibration method and system of the present invention, when utilized in connection with the automated mechanical transmission system 10, comprises a portion of the central processing unit 38. As indicated above, the automated clutch control and calibration method and system of the present invention may be separate and distinct from any transmission system control devices. The central processing unit may utilize discrete logic components or be a programmed (by means of software and/or firmware) microprocessor. If a microprocessor is utilized, the discreet logic components/circuits, such as comparators, etc., are replaced by algorithm routines and/or subroutines, etc., as is known.

The automated clutch control and calibration system of the present invention controls and calibrates operation of the vehicular master friction clutch 16 to engage and disengage same in accordance with current and/or stored parameters and logic rules. The automatic clutch control system preferably will be similar to the clutch control systems illustrated and described in aforementioned U.S. Pat. No. 4,401, 200; 4,081,065; 4,361,060 and/or 3,752,284.

Typically, in at least the start-from-stop mode of operation, the master clutch must be modulated between a fully disengaged and a fully engaged condition, or maintained at a predetermined partially engaged condition, in accordance with certain parameters which usually include at least engine speed and throttle position, to achieve an acceptably smooth start without stalling or flaring of the vehicle engine. Accordingly, in the modulated modes of clutch engagement, especially in the start-from-stop mode of operation, the clutch 16 is utilized as an essential control element of the automated mechanical transmission system. As the clutch 16 can exercise no control over the system during that portion of the engagement when it moves from the fully disengaged to the incipient engagement position, it is highly desirable to move the clutch as rapidly as possible between these positions during a modulated clutch engagement operation and then to control the degree of engagement of the clutch in a modulated manner, according to sensed, calculated and/or stored inputs and logic rules from the incipient engagement to fully engaged conditions thereof. It is known in the prior art (see aforementioned U.S. Pat. No. 4,646,891) to determine the clutch actuator 30 condition corresponding to the clutch incipient engagement condition and, in the modulated mode of operation, to switch the actuator from the rapid, unmodulated to the modulated mode of operation just prior to the occurrence of the predicted incipient engagement condition.

According to the present invention, the automated clutch control of the prior art is improved by rendering the automated clutch control more responsive and minimizing the possibility of overshooting the incipient engagement condition. This is accomplished by providing a clutch control calibration technique for determining the value of a clutch control parameter indicative of the clutch approach point, as well as a clutch actuator control parameter value indicative of the clutch incipient engagement point, wherein the clutch approach point is intermediate the fully disengaged point and the point of incipient engagement, is immediately adjacent the point of incipient engagement and preferably is a point at which the clutch will transmit torque from the engine to the transmission input shaft on an intermediate basis, provided the transmission input shaft is subject to a minimum resistance to rotation thereof. According to the clutch control of the present invention, upon completion of a clutch disengagement, while awaiting a command to initiate a modulated clutch engagement operation, the master clutch is moved to and dwells at the approach point. Thereafter, upon a command to engage the master clutch in a modulated manner, modulated engagement of the master clutch may commence by moving to the point of incipient engagement and then modulating the clutch to full engagement thereof without waiting for the master clutch to move from the fully disengaged condition to the point of incipient engagement and further minimizing the possibility of overshooting the point of incipient engagement.

Figure 3:
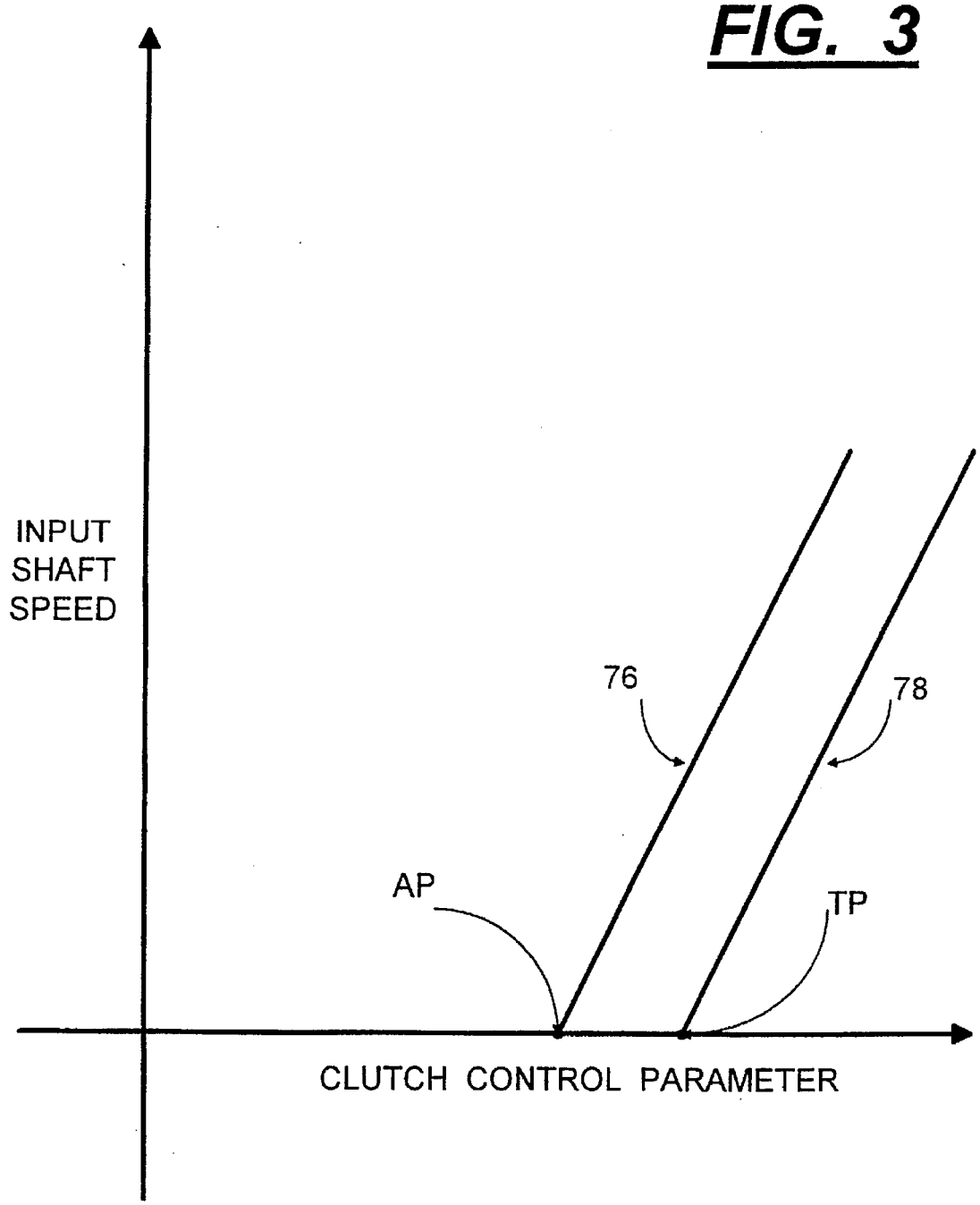
FIG. 3 is a graphical illustration of one embodiment of the touch point and approach point calibration of the present invention.

An example of the clutch calibration technique of the present invention as utilized for semi-automated transmission system 10 may be seen by reference to FIG. 3. With the vehicle stationary (OS=O), transmission 12 in neutral (GR= N), the engine 14 at idle and the input shaft brake disengaged, the clutch actuator 30 is caused to slowly move the clutch from the fully disengaged condition toward the engaged condition thereof while input shaft rotational speed (IS) is monitored. As is represented by line 76, at a certain point, the input shaft will begin to move, and this is taken as the approach point (indicated as "AP" in FIG. 3). The same procedure is repeated, except with the input shaft brake applied, as indicated by line 78, and the point at which input shaft speed is sensed is taken as the touch point or point of incipient engagement (indicated as point "TP" in FIG. 3). Points AP and TP represent values of a clutch control parameter, such as actuator pressure and/or voltage or an actuator position, as is known in the prior art. As is also known in the prior art (see, for example, aforementioned U.S. Pat. No. 5,337,874), the values of the control parameters representing the approach point and the touch point may be periodically updated to account for wear and/or changes in the clutch operating temperature and the like.

Figure 4:
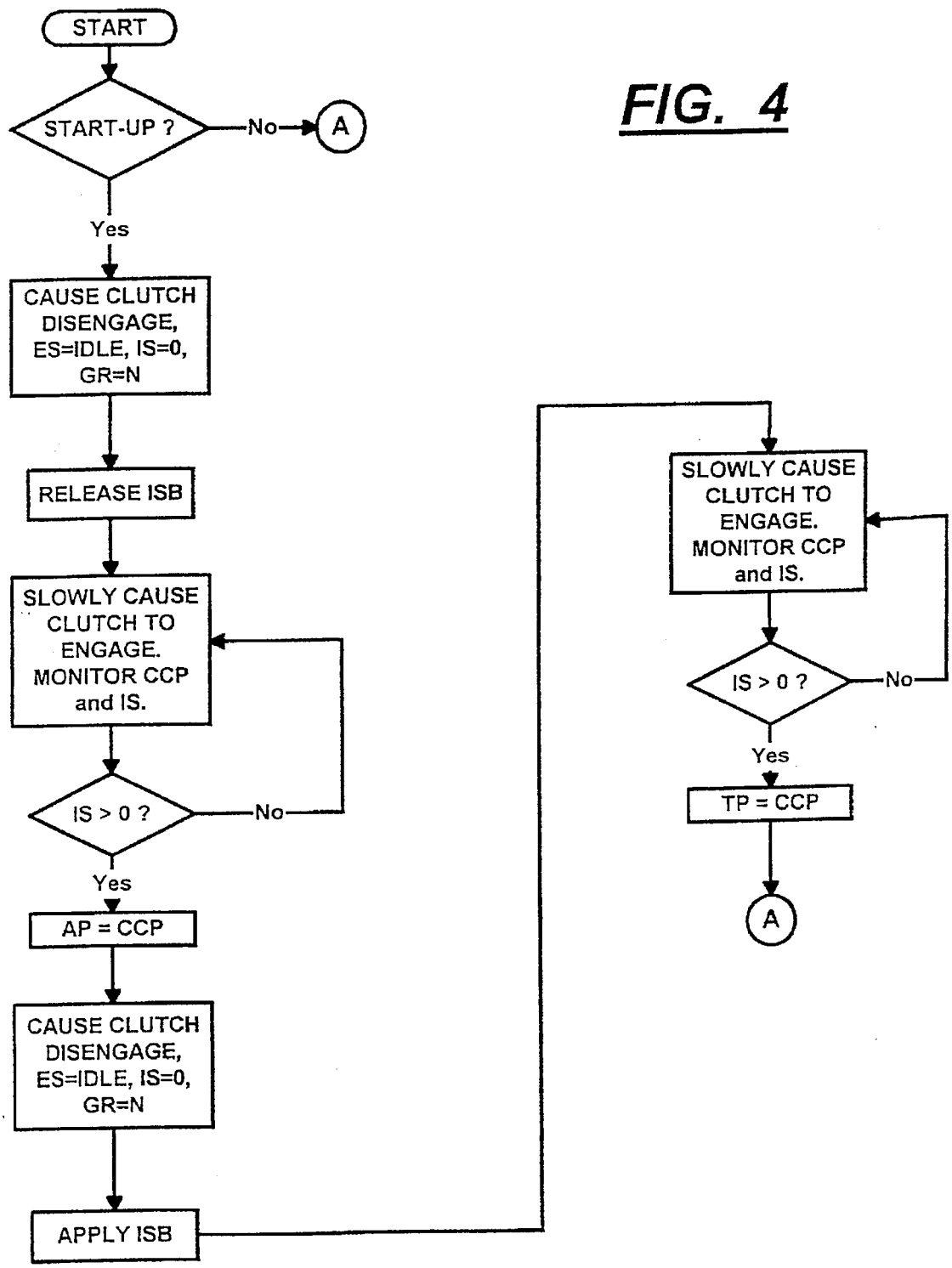
FIGS. 4 and 4A are schematic illustrations, in flow chart format, of the automated vehicular master friction clutch calibration and control of the present invention.
Figure 4A:
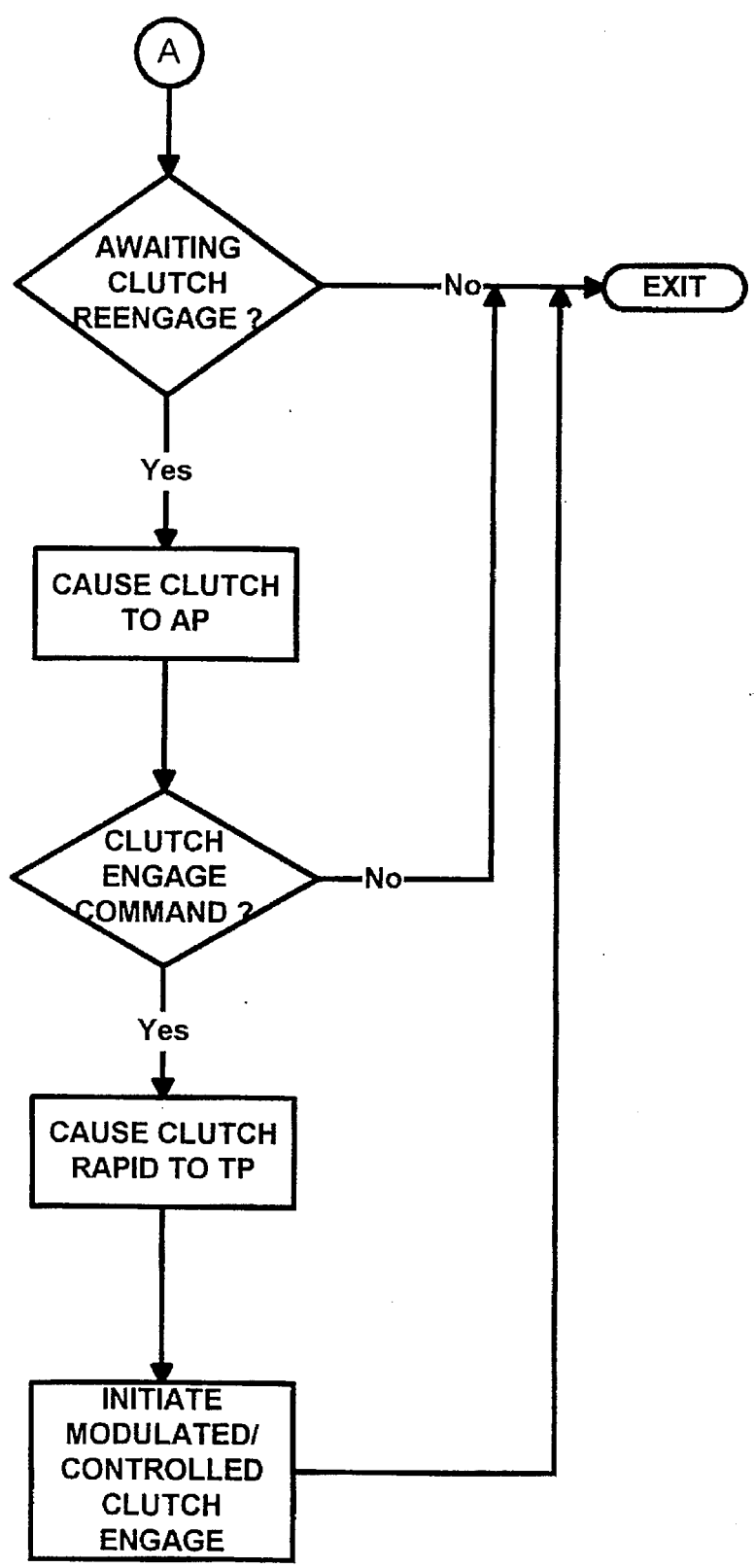

In operation, assuming the vehicle has been brought to a stop, upon disengaging the master clutch and shifting into the new start ratio, while awaiting the command to begin engaging the clutch for the start-from-stop operation, the controller 38 will command that the clutch 16 be moved to and dwell at the approach point AP. Thereafter, as the vehicle operator indicates his/her desire to launch the vehicle by depressing the throttle pedal, the control 38 will cause the clutch to move quickly to the touch point and then to begin a modulated, controlled engagement of vehicle master clutch. The automated clutch control and calibration method and system of the present invention is symbolically illustrated, in flow chart format, in FIGS. 4 and 4A.

Although the present invention has been set forth with a certain degree of particularity, it is understood that various modifications, substitutions and rearrangements of the components are possible without departing from the spirit and scope of the invention as hereinafter claimed.

I claim:
1. A method for controlling an automated vehicular master friction clutch (16) drivingly interposed between an engine (14) and an input shaft (52) of a multiple-speed transmission (12), said clutch having an approach point condition, said method characterized by:
   (a) determining a value (AP) of said clutch control parameter indicative of said clutch being at the approach point condition thereof; and
   (b) after disengaging said clutch and while awaiting a clutch engagement command, causing said clutch to assume and remain in the approach point condition thereof.

2. The method of claim 1 wherein said transmission has a controllable input shaft retarding device (18) associated therewith, said value determined while said device is inactive.

3. The method of claim 1 wherein said clutch is associated with a vehicular automated mechanical transmission system, said transmission has a controllable input shaft retarding device associated therewith and said system further comprises an electronic controller (38) for receiving input signals including a signal indicative of rotational speed of said input shaft (IS) and for processing same according to predetermined logic rules to issue command output signals to at least an engine fuel control (26), a clutch operator (30), said input shaft retarding device and a transmission operator (34);
   step (a) comprising (i) causing the engine retarding device to be released, (ii) causing the engine to idle, (iii) causing the transmission to be in neutral, (iv) causing the clutch to be slowly engaged while monitoring current values of said clutch control parameter and input shaft rotational speed and (v) upon sensing initial increased rotation of said input shaft, setting said value equal to the then current value of said clutch control parameter.

4. The method of claim 3 wherein step (c) comprises, after disengaging said clutch and while awaiting a clutch engagement command, causing said clutch to assume and remain in the approach point condition thereof.

5. A control system for controlling an automated vehicular master friction clutch (16) drivingly interposed between an engine (14) and an input shaft (52) of a multiple-speed transmission (12), said clutch having an approach point condition, said control system characterized by:
   means for determining a value (AP) of a clutch control parameter indicative of said clutch being at the approach point condition thereof; and
   means effective, after disengaging said clutch and while awaiting a clutch engagement command, for causing said clutch to assume and remain in the approach point condition thereof.

6. The control system of claim 5 wherein said clutch is associated with a vehicular automated mechanical transmission system, said transmission has a controllable input shaft retarding device associated therewith and said system further comprises an electronic controller (38) for receiving input signals including a signal indicative of rotational speed of said input shaft (IS) and for processing same according to predetermined logic rules to issue command output signals to at least an engine fuel control (26), a clutch operator (30), said input shaft retarding device and a transmission operator (34);
   said means for determining comprising means for (i) causing the engine retarding device to be released, (ii)

causing the engine to idle, (iii) causing the transmission to be in neutral, (iv) causing the clutch to be slowly engaged while monitoring current values of said clutch control parameter and input shaft rotational speed and (v) upon sensing initial increased rotation of said input shaft, setting said value equal to the then current value of said clutch control parameter.

7. The control system of claim 5 wherein said means for utilizing comprises means effective, after disengaging said clutch and while awaiting a clutch engagement command, for causing said clutch to assume and remain in the approach point condition thereof.

8. A method for controlling an automated vehicular master friction clutch (16) drivingly interposed between an engine (14) and an input shaft (52) of a multiple-speed transmission (12), said clutch having a touch point condition and an approach point condition, said method characterized by:

(a) determining a first value (TP) of a clutch control parameter indicative of said clutch being at the touch point condition thereof;

(b) determining a second value (AP) of said clutch control parameter indicative of said clutch being at the approach point condition thereof; and (c) after disengaging said clutch and while awaiting a clutch engagement command, causing said clutch to assume and remain in the approach point condition thereof.

9. The method of claim 8 wherein step (c) further comprises, upon determining that clutch engagement is required, causing said clutch to move rapidly to the touch point condition thereof and then causing further clutch engagement in a controlled and modulated manner.

10. The method of claim 8 wherein said transmission has a controllable input shaft retarding device (18) associated therewith, said first value determined while said device is active and said second value determined while said device is inactive.

11. The method of claim 8 wherein said clutch is associated with a vehicular automated mechanical transmission system, said transmission has a controllable input shaft retarding device associated therewith and said system further comprises an electronic controller (38) for receiving input signals including a signal indicative of rotational speed of said input shaft (IS) and for processing same according to predetermined logic rules to issue command output signals to at least an engine fuel control (26), a clutch operator (30), said input shaft retarding device and a transmission operator (34);

step (a) comprising (i) causing the input shaft retarding device to be applied, (ii) causing the engine to idle, (iii) causing the transmission to be in neutral, (iv) causing the clutch to be slowly engaged while monitoring current values of said clutch control parameter and input shaft rotational speed and (v) upon sensing initial increased rotation of said input shaft, setting said first value equal to the then current value of said clutch control parameter; and step (b) comprising (i) causing the input shaft retarding device to be released, (ii) causing the engine to idle, (iii) causing the transmission to be in neutral, (iv) causing the clutch to be slowly engaged while monitoring current values of said clutch control parameter and input shaft rotational speed and (v) upon sensing initial increased rotation of said input shaft, setting said second value equal to the then current value of said clutch control parameter.

12. The method of claim 11 wherein step (c) comprises, after disengaging said clutch and while awaiting a clutch engagement command, causing said clutch to assume and remain in the approach point condition thereof.

13. The method of claim 12 wherein step (c) further comprises, upon determining that clutch engagement is required, causing said clutch to move rapidly to the touch point condition thereof and then causing further clutch engagement in a controlled and modulated manner.

* * * * *